United States Patent [19]

Sundblad

[11] Patent Number: 5,227,031
[45] Date of Patent: Jul. 13, 1993

[54] PROCESS FOR THE PRODUCTION OF CHLORINE DIOXIDE

[75] Inventor: Birgitta Sundblad, Sundsvall, Sweden

[73] Assignee: Eka Nobel AB, Bohus, Sweden

[21] Appl. No.: 727,405

[22] Filed: Jul. 8, 1991

[30] Foreign Application Priority Data

Jun. 26, 1991 [SE] Sweden ................ 9101977

[51] Int. Cl.$^5$ ................ B01D 61/00
[52] U.S. Cl. ................ 204/104; 204/128; 204/182.4; 204/182.3; 204/151
[58] Field of Search ........ 204/182.4, 182.3, 151, 204/104, 128; 423/553, 551

[56] References Cited

U.S. PATENT DOCUMENTS

| | | |
|---|---|---|
| 3,789,108 | 1/1974 | Rapson ................ 423/551 |
| 3,864,456 | 2/1975 | Winfield et al. ........ 423/551 |
| 3,933,988 | 1/1976 | Rosen ................ 423/551 |
| 4,081,520 | 3/1978 | Swindells et al. ........ 423/551 |
| 4,129,484 | 12/1978 | Larsson ................ 204/101 |
| 4,248,601 | 2/1981 | McGough et al. ........ 23/293 R |
| 4,325,934 | 4/1982 | Swindells et al. ........ 423/551 |
| 4,504,373 | 3/1985 | Mani et al. ............ 204/182.4 |
| 4,554,139 | 11/1985 | Worthington et al. ........ 423/551 |
| 5,093,089 | 3/1992 | Alford et al. ............ 423/551 |

Primary Examiner—John Niebling
Assistant Examiner—Arun S. Phasge
Attorney, Agent, or Firm—Burns, Doane, Swecker & Mathis

[57] ABSTRACT

A process for the production of chlorine dioxide by reacting an alkali metal chlorate, mineral acid and a reducing agent in such proportions that chlorine dioxide is produced in a reaction medium which is maintained at a temperature of 50° C.–100° C. and at an acidity within a range of 2–12 N and which is subjected to subatmospheric pressure sufficient for evaporating water. A mixture of chlorine dioxide and water vapour is withdrawn from an evaporation zone in the reaction vessel, and alkali metal sulphate is precipitated in a crystallization zone in the reaction vessel. The precipitated alkali metal sulphate is contacted with a saturated water solution of alkali metal sulphate whereafter neutral alkali metal sulphate is precipitated and dissolved in water. The water solution is brought to an electrochemical membrane cell in which sulphuric acid is formed in the anode compartment and alkali metal hydroxide in the cathode compartment.

10 Claims, 1 Drawing Sheet

PROCESS FOR THE PRODUCTION OF CHLORINE DIOXIDE

BACKGROUND OF THE INVENTION

The present invention relates to a process for the production of chlorine dioxide from an alkali metal chlorate, a mineral acid and a reducing agent. The process is carried out in a vessel operated under subatmospheric pressure, whereby water is evaporated and withdrawn together with chlorine dioxide and the alkali metal salt of the mineral acid is crystallized within the reaction vessel and withdrawn therefrom. According to the invention the precipitated alkali metal sulphate is contacted with a saturated water solution of alkali metal sulphate, whereafter neutral alkali metal sulphate is obtained. A water solution of this alkali metal sulphate is brought to an electrochemical membrane cell in which sulphuric acid is formed in the anode compartment and alkali metal hydroxide in the cathode compartment.

Chlorine dioxide used as an aqueous solution is of considerable commercial interest, mainly in pulp bleaching but also in water purification, fat bleaching, removal of phenols from industrial wastes, etc. It is therefore desirable to provide processes by which chlorine dioxide can be efficiently produced.

Chlorine dioxide is prepared by reduction of chlorate with a reducing agent in acid media. The most common reducing agents are chloride ions, sulphur dioxide and methanol and the processes can be summarized according to the following formulas:

$NaClO_3 + NaCl + H_2SO_4 \rightarrow ClO_2 + \frac{1}{2} Cl_2 + H_2O + Na_2SO_4$
$2 NaClO_3 + SO_2 \rightarrow 2 ClO_2 + Na_2SO_4$
$6 NaClO_3 + CH_3OH + 4 H_2SO_4 \rightarrow 6 ClO_2 + CO_2 + 5 H_2O + 2 Na_3H(SO_4)_2$ The chlorate ions are provided by alkali metal chlorate, preferably sodium chlorate, the chloride ions by alkali metal chloride, preferably sodium chloride, or by hydrogen chloride, and the hydrogen ions are provided by mineral acids, generally sulfuric acid and/or hydrochloric acid.

These processes can be run at a normal pressure and usually the acid strength is high in the reaction medium to obtain sufficient efficiency in the process. Because of the high acid strength of the reaction medium the spent acid liquor from the reactor will consist of alkali metal sulphate in strong sulphuric acid. This spent acid liquor is a waste product which it is necessary to take care of. Depositing the spent acid liquor in the waste water system is neither possible nor desirable as the environmental demands do not permit depositing and the acid content of the liquor then gets lost.

It is also known to run the above mentioned processes at a subatmospheric pressure by using a combined reactor/evaporator. Alkali metal chlorate, reducing agent and mineral acid solutions are fed to a single vessel generator-evaporator-crystallizer in proportions sufficient to generate chlorine dioxide and chlorine, at a temperature of from about 50 to about 100 degrees centigrade, and an acidity of from about 2 to about 12 normal, with or without a catalyst. Water is removed by vacuum-induced evaporation at about 100 to 400 millimeters of mercury absolute, with concurrent withdrawal of chlorine dioxide and chlorine. The salt of the mineral acid is crystallized within the generator and the crystals withdrawn from the vessel. These crystals contain more or less acid depending on the acid strength of the reaction medium. It is only when the acid strength is below 4.8 N that a neutral sulphate is obtained, otherwise the precipitated crystals consist of sesquisulphate ($Na_3H(SO_4)_2$) or bisulphate ($NaHSO_4$).

The usual way to take care of the sulphate product has hitherto been to use it for tall oil splitting and as a "make up" in the cellulose plant, but in the latter case the acid content of the sulphate has not been utilized, but the sulphate crystals have been neutralized. Another field of use for the neutral sulphate waste product has been as a filler in detergents. However, the amount of sulphate used in both these fields decreases steadily because of change of production processes.

One advantageous way of utilize the spent liquor from the chlorine dioxide process is described in U.S. Pat. No. 4,129,484. This patent describes a process in which the spent acid liquor from a chlorine dioxide reactor is brought to an electrochemical membrane cell. According to one embodiment the cell comprises, besides the anode and cathode, at least one anion selective membrane and one cation selective membrane. Then at the electrolysis sodium hydroxide and hydrogen gas is formed in the cathode compartment and sulphuric acid and oxygen gas in the anode compartment. Thus only valuable chemicals are produced. The acid can be brought back to the chlorine dioxide reactor and the hydroxide can be used in the cellulose plant for example.

Although the manner of dealing with the sulphate residue according to the process in U.S. Pat. No. 4,129,484 is favourable it appeared that the process had certain draw backs. The spent acid liquor contains besides sulphate also chlorate and chloride ions and the solution is often very acidic. When this liquor is brought to the cell the chlorate ions will also migrate to the anode compartment and will there easily be transformed to chlorine dioxide in the acidic solution. Also chloride ions will be transformed to chlorine gas. Thus the reaction gas from the anode compartment will be a mixture of chlorine dioxide, chlorine and oxygen in stead of pure oxygen. It also appeared that it was difficult to run the electrochemical membrane cell for a time of any substantial length. After a while the voltage tended to rise, resulting in increased energy consumption and the membrane stopped to function. The reason for this was precipitations on the cathode and in the cathode membrane due to the use of the spent acid liquor. This liquor besides the sulphate and chlorate ions also often contains different metal ions such as Ca, Fe, Mg, Cr etc. being impurities emanating from the process water. At the electrolysis hydroxide ions are formed on the cathode surface and hence the solution on the surface will be very basic. Then the hydroxides of the metal impurities mentioned above will easily be precipitated. The same will also happen in the cathode membrane which will ultimately break down.

SUMMARY OF THE INVENTION

It is accordingly an object of the present invention to provide a chlorine dioxide process in which the sulphate residue has been worked up to useful chemicals.

It is further an object of the present invention to provide a process for working up precipitated sulphate in a more efficient way than known processes.

BRIEF DESCRIPTION OF THE DRAWING

For a full understanding of the invention, the following detailed description should be read in conjunction with the drawing, wherein.

Figure 1:
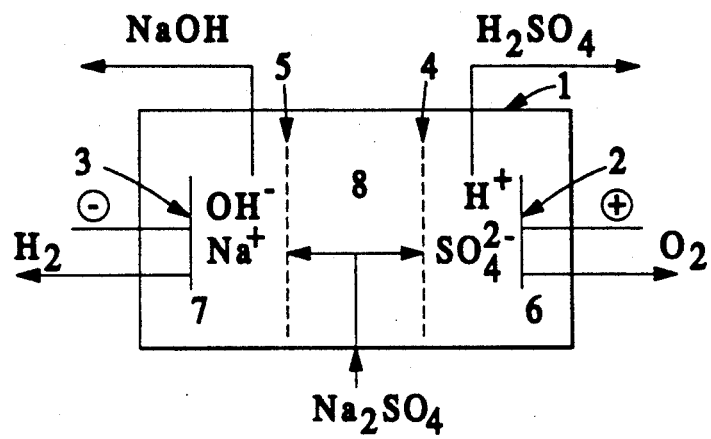
FIG. 1 is a schematic diagram of an electrolytic vessel used in the process of the present invention.

In the present invention the problems with utilizing the waste sulphate from chlorine dioxide processes has been solved by using a water solution of a purified neutral sulphate in an electrochemical membrane cell. By using the precipitated sulphate produced according to the single vessel process mentioned above and working this sulphate up in a new manner the resultant sulphate could be used in an electrochemical process with good efficiency.

The problem with the purification of the acid salt cake being the residue from the chlorine dioxide process has been dealt with in different manners in several patents. In for example U.S. Pat. No. 4,483,740 the acid salt cake has been treated in a three stage evaporation/crystallization process. In other methods the acid salt is washed with water in several steps in a column as e.g. in DE 28 56 504. In stead of these energy and water consuming processes it was found in the present invention that the acid sulphate crystals could be transformed to neutral crystals if they were contacted with a saturated water solution of sulphate. In the saturated solution the acid crystals do not dissolve, but they will be transformed in the solid state from acid crystals to neutral crystals.

The object of the invention was thus achieved by a process, as claimed in the claims, for the production of chlorine dioxide using a single vessel process with a reduced pressure and precipitating the alkali metal sulphate in the crystallization zone in the reaction vessel. The precipitated alkali metal sulphate is contacted with a saturated water solution of alkali metal sulphate. Neutral alkali metal sulphate crystals are formed and these crystals are dissolved in water and the water solution is brought to an electrochemical membrane cell. In the cell sulphuric acid is formed in the anode compartment and alkali metal hydroxide in the cathode compartment.

As mentioned above the precipitated sulphate from the single vessel process can be neutral or contain acid, the sulphate being in the form of sesqui- or bisulphate. Before the sulphate is brought to the membrane cell it must be purified from its acid content as well as from other contaminations such as chlorate. According to the invention the precipitated sulphate is contacted with a saturated solution of alkali metal sulphate. This can be carried out in e.g. a screw thickener or in other suitable apparatus for efficient solid liquid contacting. The crystals from the chlorine dioxide reactor are brought to the screw thickener and there contacted with the saturated alkali metal solution. If the crystals from the reactor contain acid they are transformed from the sesquisulphate state to the neutral state without being dissolved. Other contaminations such as chlorate will be dissolved. If the crystals from the reactor already are neutral only the removal of contaminations will take place. However, above all the chlorate contaminations may be considerable, depending on process and process conditions. Usually the precipitated sulphate contains only a few per cent of chlorate, but values of up to about 10 per cent of chlorate, sometimes more can exist. One advantage with the contacting of the precipitated sulphate with the saturated solution is that this purification also results in a levelling out of the amount of chlorate contamination in the sulphate. Thus, independent of the content in the precipitated sulphate, the amount left after the purification in the screw thickener is not more than about 0.5 per cent. In this way the purification in the screw thickener facilitates a continous operation. From the screw neutral purified crystals will be discharged.

The neutral purified sulphate crystals will then be dissolved in water and the water solution brought to an electrochemical membrane cell. Electrolytic membrane cells are well known as such and any conventional cell can be used in the invention. Principally a membrane cell contains one or more cathodes, one or more anodes and between them one or more ion selective membranes. The material of the cathode may be graphite, steel, nickel or titanum and the material of the anode can be noble metal, noble metal oxide, graphite, nickel or titanum. The membrane used may for example be of the molecular screen type, the ion exchange type or salt bridge type, homogeneous or heterogeneous, organic or inorganic.

In a simple cell there are besides the electrodes, one cation selective membrane and one anion selective membrane. The electrodes and the membranes form a unit cell with three compartments, one cathode compartment, one intermediate compartment and one anode compartment. When the neutral sulphate solution is brought to the intermediate compartment the sulphate ions migrate through the anion membrane to the anode and the alkali metal ions migrate through the cation membrane to the cathode. Water dissociate at the electrodes and hydrogen gas forms at the cathode and oxygen gas at the anode. The dissociation of water results in alkali hydroxide formation in the cathode compartment and sulphuric acid formation in the anode compartment. In stead of a simple cell as described a cell with a stack of several electrodes and cation and anion membranes can be used. It is also possible to use cells with bipolar membranes, or only two compartment cells.

If the sulphate is contaminated with metal ions such as calcium, manganese, iron etc. as mentioned above these ions have to be separated in an ion exchanger. Thus it will usually be necessary to bring the dissolved neutral crystals to an ion exchanger before the solution is introduced into the membrane cell unless very pure water has been used in the process. If the membranes used are sensitive for the remaining low chlorate content it is suitable to reduce this chlorate with a reducing agent such as sulphite, hydrogen peroxide or formic acid.

When the precipitated sulphate from the chlorine dioxide reactor is an acid sulphate the acid content of the saturated alkali metal sulphate solution is increased when contacted with this sulphate When the acid content reach 4.8 N the saturated solution has to be regenerated. This can be accomplished e g. by cooling the solution and precipitating the neutral alkali metal sulphate. The mother liquor from the precipitation which contains all acid and impurities such as chlorate can be brought back to the chlorine dioxide reactor. The precipitated sulphate can then anew be dissolved in water to a saturated solution.

The method with purification of the contaminated sulphate with a saturated solution is very favourable as the sulphate does not then dissolve. If instead water had been used for the purification as much as 70% of the sulphate would have been dissolved.

As mentioned the salt precipitated from the chlorine dioxide reactor is a neutral sulphate only when the acid strength of the reaction medium is up to 4.8 N. However, at such a low acid normality the chlorine dioxide formation reaction is very slow and usually catalysts must be used to get an acceptable process. Still most commercial processes operate at a higher acid normality. One process working at a low acidity and with a high efficiency is known from the U.S. patent application 576949. In this application chlorine dioxide is produced in a single vessel reactor at reduced pressure with hydrogen peroxide as the reducing agent. An advantageous manner of producing chlorine dioxide and thereby obtain a neutral sulphate is in a combination of two reactors, both reactors being single vessel reactors operating at a reduced pressure. In the first reactor the acidity of the reaction medium is above 4.8 N. The acid sodium sulphate precipitated in this reactor is then used as the sole or at least to a part as the acid source in the second reactor. The acidity in this reactor will be below 4.8 N and the process will be run with hydrogen peroxide as the reducing agent. With this combination the acid content of the first reactor is used maximally. If the reducing agent in the first reactor is e.g. methanol an essentially chlorine free chlorine dioxide will be produced. The sulphate taken out of the process will be neutral. This neutral salt can then be brought to the screw thickener and thereafter to the electrolytic membrane cell. This manner of producing neutral sulphate is a preferred embodiment of the invention.

The production of chlorine dioxide according to the present process is performed in a single reaction vessel, generator-evaporator-crystallizer. A suitable reactor is an SVP ® (single vessel process) reactor. The reactants are added continuously to the reactor. The alkali metal chlorate is added in an amount of from 1.58 to 2.0 tonne/tonne chlorine dioxide and the reducing agent in an amount depending on the reducing agent used. The reaction is suitably operated at a temperature of 50°-100° C., preferably 50°-75° C. and at a pressure below atmospheric pressure, suitably at 60-400 mm Hg. Then the reaction medium boils and water is evaporated in a sufficient amount to dilute the chlorine dioxide formed to a safe concentration. The acidity in the reactor is adjusted to a value between 2 and 12 N, preferably between 2 and 9 N, by adding a mineral acid, preferably sulfuric acid. In the reactor, the alkali metal salt of the mineral acid is continuously crystallized and separated in a suitable manner.

All known reducing agents such as methanol, formaldehyde, formic acid, sugar alcohols, sulfur dioxide hydrogen peroxide and chloride can be used. Catalyst such as silver, manganese, vanadium, molybdenum, palladium and platinum can also be added if appropriate.

The process is not restricted to any of the alkali metals, but sodium is the most preferred.

The separated sulphate crystals are then brought to the screw thickener and contacted with a saturated solution of a neutral sulphate. The temperature of the solution is 0°-100° C., preferably 40°-50° C. In the screw thickener the temperature is kept the same as in the solution. The neutral salt crystals from the screw thickener is dissolved in water to a concentration of 150-450 gpl, preferably 200-250 gpl. This solution is usually brought to an conventional ion exchanger for removal of metal ions and then to the membrane cell. If necessary recidual chlorate ions are reduced before feeding to the cells.

Preferably the electrolytic membrane cell used in the present process is an electrolytic vessel containing two electrodes and between them at least one cation and one anion selective membrane. The principle of the cell will now be described from the figures: In FIG. 1 (1) denotes the electrolytic vessel containing an anode (2), a cathode (3), an anion selective membrane (4) and a cation selective membrane (5), the membranes dividing the cell in three compartments, the anode compartment (6), the cathode compartment (7) and an intermediate compartment (8). The solution of purified crystals is introduced in the intermediate compartment (8). When voltage is applied to the cell sulphate ions will migrate from the intermediate compartment through the membrane (4) into the anode compartment (6). At the anode water is decomposed whereby oxygen gas and hydrogen ions are formed. The formed gas leaves the cell while the hydrogen ions remain in the solution forming the acid with the sulphate ions. In the cathode compartment hydrogen gas forms at the water decomposition leaving hydroxyl ions in the solution. This hydroxyl ions together with migrated alkali metal ions form the alkali metal hydroxide solution. Both the solutions from the anode and the cathode compartments are withdrawn for further use.

Figure 2:
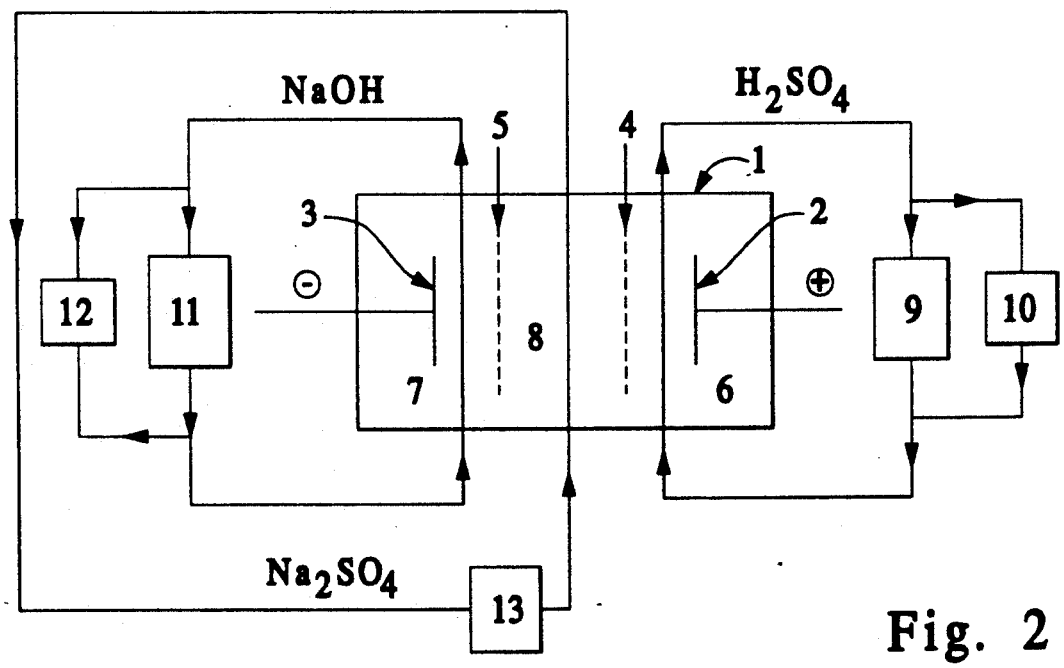
FIG. 2 is a schematic diagram of the electrolytic vessel illustrating the circulation of solutions in the anode and cathode compartments.

It is also possible to circulate the solutions in the anode and cathode compartments as shown in FIG. 2. The acid solution stream is circulated through a vessel 9 and the basic solution through a vessel 11 to increase the concentration of the solutions. When the concentration has reached a predetermined value a part of the solution is brought to a storage vessel 10 and 12 respectively. The salt solution is also recirculated through the intermediate compartment and salt making up the depleted solution is added in a vessel 13.

The oxygen and hydrogen gas formed can be used e.g. the oxygen in the pulp plant for bleaching and the hydrogen for combustion.

The invention is now illustrated by means of the following examples, where parts and percentages mean parts by weight and percentages by weight, unless otherwise specified.

WASHING

Example 1

100 g $Na_3H(SO_4)_2$ was washed with a solution saturated with sodium sulphate at 50° C. The contact time was 1 minute. When 105 ml wash solution was used the acid content in the crystals was lowered to 12% of original concentration while only 8% of the $Na_2SO_4$ in the sesqui sulphate was dissolved.

Example 2

Another test was conducted according to example 1 with the difference that 210 ml wash solution was used. The acid content was reduced to 3% of original concentration while 11% of the $Na_2SO_4$ content was dissolved.

Example 3

A test was conducted according to the procedure in example 2, with the difference that the content of $NaClO_3$ in $Na_3H(SO_4)_2$ was higher than normal. The $NaClO_3$ content was 5%, approximately 10 to 20 times higher than can be normally expected. Washing with 210 ml saturated sodium sulphate solution reduced the chlorate concentration to 14% of the original value. The acid concentration was lowered to 3% of original strength and 11% of $Na_2SO_4$ was dissolved.

ELECTROLYSIS

Example 1

A three chambered electrolytic cell with 4 $dm^2$ electrode area was operated in a batchwise manner.

Nickel cathode and titanium anode were used as electrodes and membranes were supplied by Fokuyama soda. Neosepta CL 25T was used on the cathode side and Neosepta AFN on the anode side. The cell was operated at a temperature of 50° C. with a current density of 2 $kA/m^2$. The concentration of the sodium sulphate solution in the middle chamber was held constant at 250−20 gpl, while the acid and caustic concentrations were allowed to increase from 2 to 7% in the anode and the cathode chambers respectively.

The overall yield for production of 7% NaOH was 94% at an energy consumption of 3,400 kwh/ton NaOH.

Example 2

Another test was run according to the conditions in example 1 where the overall energy consumption for the production of 10% NaOH was 3,500 kwh/ton. The test was run to increase the concetrations of acid and sodium hydroxide up to 17% resulting in an energy consumption of 4,000 kwh/ton NaOH.

Example 3

Yet another test was run according to the conditions in example 1 with the difference of operating at a higher current density, 3 $kA/m^2$. The net result of this is 50% increased production rate, but also higher energy consumption figures. A 10% NaOH solution can be produced with an energy consumption of 4,000 kwh/ton. The test was continued to a concentration of 14% of acid and sodium hydroxide, resulting in an energy consumption of 4,400 kwh/ton NaOH.

Example 4

A test was run according to the conditions in example 1 with the exception that the membranes were supplied by Asahi Glass. Selemion CMV was used on the cathode side and Selemion AMV on the anode side. A 10% NaOH solution could be produced with an energy consumption of 3,700 kwh/ton and the experiment was run to obtain solutions with a concentration of 16% with an energy consumption of 4,000 kwh/ton NaOH.

Example 5

A test was run according to the conditions in example 4 with the difference of operating at a current density of 3 $kA/m^2$. At 10% concentration of the solutions the energy consumption was 4,600 kwh/ton NaOH and the experiment was run to obtain 16% solutions with an energy consumption of 4,900 kwh/ton NaOH.

I claim:

1. A process for the production of chlorine dioxide, and the production of sulfuric acid from by-product alkali metal sulfate, comprising the steps of:

(a) reacting in a reaction vessel an alkali metal chlorate, mineral acid and a reducing agent in such proportions that chlorine dioxide is produced in a reaction medium, maintained at a temperature of from about 50° C. to about 100° C. and at an acidity of from about 2 to about 12 N and which is subjected to subatmospheric pressure sufficient for evaporating water;

(b) withdrawing a mixture of chlorine dioxide and water vapor from an evaporation zone in the reaction vessel;

(c) precipitating crude alkali metal sulfate in a crystallization zone in the reaction vessel;

(d) contacting the precipitated alkali metal sulfate with a saturated aqueous solution of neutral alkali metal sulfate, thereby converting the precipitated crude alkali metal sulfate to a purified, neutral alkali metal sulphate precipitate;

(e) dissolving the purified, neutral sulphate in water; and (f) electrolyzing the resulting neutral sulphate solution in an electrochemical membrane cell, thereby forming sulfuric acid in an anode compartment of the cell and alkali metal hydroxide in the cathode compartment of the cell.

2. A process according to claim 1, wherein the precipitated alkali metal sulphate from the chlorine dioxide reactor is alkali metal sesqui sulphate which is transformed to a neutral alkali metal salt by being contacted with the saturated alkali metal sulphate solution.

3. A process according to claim 1, wherein the precipitated alkali metal sulphate from the chlorine dioxide reactor is a neutral salt which is purified from contaminations by being contacted with the saturated alkali metal sulphate solution.

4. A process according to claim 1, wherein precipitated alkali metal sulphate is contacted with the saturated water solution of alkali metal sulphate in a screw thickener.

5. A process according to claim 3, wherein neutral alkali metal sulphate is obtained from a process in which the reducing agent is hydrogen peroxide and the mineral acid is added in the form of alkali metal sesquisulphate.

6. A process according to claim 1, wherein water solution before being introduced into the membrane cell is brought to an ion exchanger.

7. A process according to claim 1, wherein when the acid content of the saturated water solution of alkali metal sulphate reaches 4.8 N the solution is withdrawn and cooled to precipitate and separate alkali metal sulphate and the residual mineral acid solution is brought back to the chlorine dioxide reaction vessel.

8. A process according to claim 1, wherein mineral acid from the membrane cell is brought to the chlorine dioxide reaction vessel.

9. A process according to claim 1, wherein sulphuric acid stream formed in the anode compartment is circulated via the anode compartment to increase the concentration of the solution.

10. A process according to claim 1, wherein alkali metal hydroxide stream formed in the cathode compartment is circulated via the cathode compartment to increase the concentration of the solution.

* * * * *